(12) United States Patent
Keller et al.

(10) Patent No.: US 9,509,547 B2
(45) Date of Patent: Nov. 29, 2016

(54) SELECTION OF SERVICE DOMAIN IN IMS CENTRALISED SERVICES (75) Inventors: Ralf Keller, Würselen (DE); Fredrik Lindholm, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 651 days.

(21) Appl. No.: 13/990,746

(22) PCT Filed: Dec. 7, 2010

(86) PCT No.: PCT/EP2010/069106
§ 371 (c)(1),
(2), (4) Date: Sep. 11, 2013

(87) PCT Pub. No.: WO2012/076042
PCT Pub. Date: Jun. 14, 2012

(65) Prior Publication Data
US 2013/0343279 A1 Dec. 26, 2013

(51) Int. Cl.
*H04W 4/00* (2009.01)
*H04L 29/06* (2006.01)
*H04W 48/18* (2009.01)

(52) U.S. Cl.
CPC ...... *H04L 29/06183* (2013.01); *H04L 65/1016* (2013.01); *H04L 65/1063* (2013.01); *H04L 65/1069* (2013.01); *H04W 48/18* (2013.01)

(58) Field of Classification Search
CPC .................................................... H04W 48/18
USPC ........................................................ 370/328
See application file for complete search history.

(56) References Cited

U.S. PATENT DOCUMENTS

| 2003/0027569 A1* | 2/2003 | Ejzak ................. H04L 12/5895 455/432.1 |
| 2003/0027595 A1* | 2/2003 | Ejzak ................. H04L 12/5895 455/560 |

(Continued)

FOREIGN PATENT DOCUMENTS

| EP | 1 892 897 A1 | 2/2008 |
| WO | WO 2007/068927 A1 | 6/2007 |
| WO | WO 2008/055525 A1 | 5/2008 |

OTHER PUBLICATIONS

International Search Report, Application No. PCT/EP2010/069106, Apr. 12, 2011.

(Continued)

*Primary Examiner* — Guang Li
(74) *Attorney, Agent, or Firm* — Myers Bigel, P.A.

(57) ABSTRACT

The invention includes methods of using IMS Centralized Services, ICS, in the selection of a service domain relating to a call involving a User Equipment, UE, being served by a CS access network. In one aspect a method includes receiving a request from a routing node, such as a Mobile Switching Center, MSC, or a Gateway Mobile Switching Center, GMSC, for a service domain selection at a Service Control Point, SCPin the UE's IMS network (801). The SCP has a Service Domain Selection, SDS, function, which retrieves data relating to the UE from a Domain Selection function (802). Based on the retrieved data, the SDS selects either the IMS service domain or the CS service domain as the service domain for routing the call (803), and sends an indication of the selected service domain to the routing node (805). Other aspects include methods for domain selection at the originating and terminating sides of the call, and network entities configured to carry out the methods.

20 Claims, 5 Drawing Sheets

(56) References Cited

U.S. PATENT DOCUMENTS

| | | | | |
|---|---|---|---|---|
| 2006/0154665 | A1* | 7/2006 | Svensson | H04W 36/0022 455/436 |
| 2007/0183410 | A1* | 8/2007 | Song | H04M 3/42008 370/352 |
| 2007/0238468 | A1* | 10/2007 | Buckley | H04Q 3/0045 455/445 |
| 2008/0102844 | A1* | 5/2008 | Zhu | H04L 45/00 455/445 |
| 2008/0160995 | A1* | 7/2008 | Thiebaut | H04L 29/06027 455/433 |
| 2008/0267171 | A1* | 10/2008 | Buckley | H04L 29/06027 370/352 |
| 2008/0268819 | A1* | 10/2008 | Zhu | H04L 12/66 455/414.1 |
| 2009/0003276 | A1* | 1/2009 | Mutikainen | H04W 48/18 370/329 |
| 2009/0185557 | A1* | 7/2009 | Song | H04L 65/1016 370/352 |
| 2010/0144351 | A1* | 6/2010 | Witzel | H04W 36/0022 455/435.2 |
| 2010/0322215 | A1* | 12/2010 | Keller | H04W 36/0066 370/338 |
| 2011/0182235 | A1* | 7/2011 | Shaheen | H04L 65/1093 370/328 |
| 2012/0124222 | A1* | 5/2012 | Noldus | H04L 61/3085 709/227 |
| 2012/0169825 | A1* | 7/2012 | Patel | H04M 7/0072 348/14.01 |

OTHER PUBLICATIONS

Written Opinion of the International Searching Authority, Application No. PCT/EP2010/069106, Apr. 12, 2011.

China Mobile, "Scenario of the domain selection capability of HLR", 3GPP TSG SA SG2 Meeting #80, Agenda Item 8.5.3, TD S2-103580, Aug. 30-Sep. 3, 2010, Brunstad, Norway, 3 pp.

3GPP, Technical Specification: $3^{rd}$ Generation Partnership Project; Technical Specification Group Services and System Aspects; IP Multimedia Subsystem (IMS) Service Continuity; Stage 2 (Release 12), 3GPP TS 23.237, V12.2.0 (Mar. 2013), 169 pages.

3GPP, Technical Specification: $3^{rd}$ Generation Partnership Project; Technical Specification Group Services and System Aspects; IP Multimedia Subsystem (IMS) centralized services; Stage 2 (Release 12), 3GPP TS 23.292, V12.1.0 (Mar. 2013), 120 pages.

3GPP, Technical Specification: $3^{rd}$ Generation Partnership Project; Technical Specification Group Services and System Aspects; IP Multimedia Subsystem (IMS); Stage 2 (Release 12), 3GPP TS 23.228, V12.0.0 (Mar. 2013), 290 pages.

3GPP, Technical Specification: $3^{rd}$ Generation Partnership Project; Technical Specification Group Core Network and Terminals; Mobile radio interface Layer 3 specification; Core network protocols; Stage 3 (Release 12), 3GPP TS 24.008, V12.1.0 (Mar. 2013), 679 pages.

\* cited by examiner

SELECTION OF SERVICE DOMAIN IN IMS CENTRALISED SERVICES

CROSS REFERENCE TO RELATED APPLICATION

This application is a 35 U.S.C. §371 national stage application of PCT International Application No. PCT/EP2010/069106, filed on 7 Dec. 2010, the disclosure and content of which is incorporated by reference herein in its entirety. The above-referenced PCT International Application was published in the English language as International Publication No. WO 2012/076042 A1 on 14 Jun. 2012.

TECHNICAL FIELD

The invention relates to the field of communications networks, and in particular to the selection of service domains for call/sessions in IP Multimedia Subsystem Centralized Services networks.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. The IMS is defined in the 3GPP Specification 23.228.

The IMS makes use of the Session Initiation Protocol (SIP) to set up and control calls or sessions between user terminals (or user terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Figure 1:
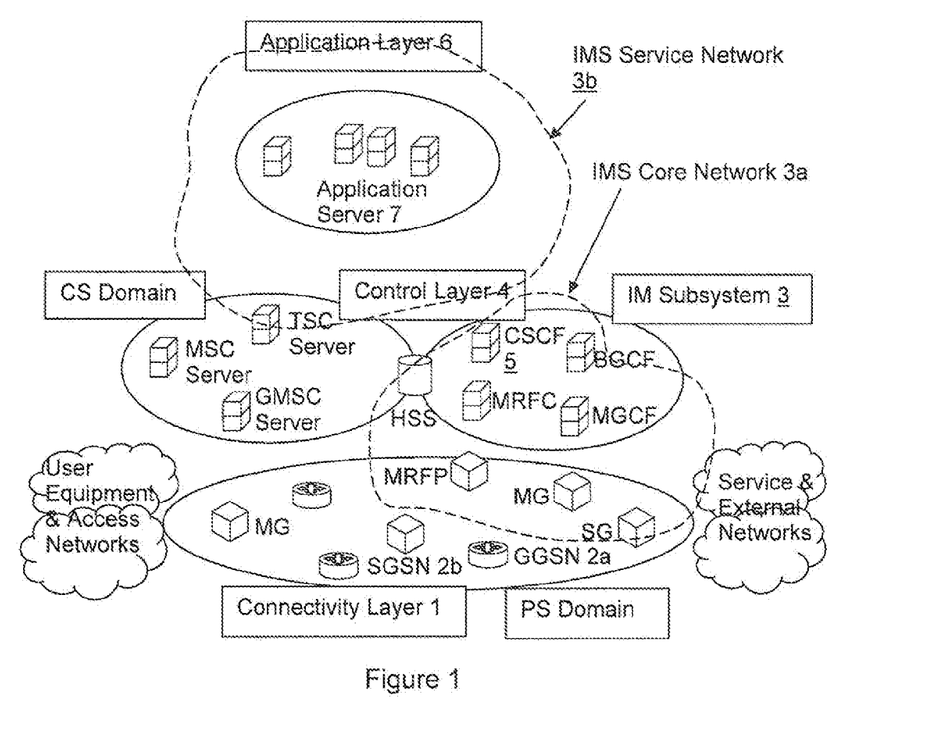
FIG. 1 illustrates schematically in a block diagram an IP Multimedia Subsystem network.

FIG. 1 illustrates schematically how the IMS 3 fits into the mobile network architecture in the case of a GPRS/PS access network. As shown in FIG. 1 control of communications occurs at three layers (or planes). The lowest layer is the Connectivity Layer 1, also referred to as the bearer, or traffic plane and through which signals are directed to/from user terminals accessing the network. The GPRS network includes various GPRS Support Nodes (GSNs) 2a, 2b. A gateway GPRS support node (GGSN) 2a acts as an interface between the GPRS backbone network and other networks (radio network and the IMS network). A Serving GPRS Support Node (SGSN) 2b keeps track of the location of an individual Mobile Terminal and performs security functions and access control. Access to the IMS 3 by IMS subscribers is performed through an IP-Connectivity Access Network (IP-CAN). In FIG. 1 the IP-CAN is a GPRS network including entities linking the user equipment to the IMS 3 via the connectivity layer 1.

The IMS 3 includes a core network 3a, which operates over the Control Layer 4 and the Connectivity Layer 1, and a Service Network 3b. The IMS core network 3a includes nodes that send/receive signals to/from the GPRS network via the GGSN 2a at the Connectivity Layer 1 and network nodes that include Call/Session Control Functions (CSCFs) 5. The CSCFs 5 include Serving CSCFs (S-CSCF) and Proxy CSCFs (P-CSCF), which operate as SIP proxies within the IMS in the middle, Control Layer.

At the top is the Application Layer 6, which includes the IMS service network 3b. Application Servers (ASs) 7 are provided for implementing IMS service functionality. Application Servers 7 provide services to end-users on a session-by-session basis, and may be connected as an end-point to a single user, or "linked in" to a session between two or more users. Certain Application Servers 7 will perform actions dependent upon subscriber identities (either the called or calling subscriber, whichever is "owned" by the network controlling the Application Server 7).

IMS relies on Internet Protocol (IP) as a transport technology. Using IP for voice communications, however, presents some challenges, especially in the mobile community where Voice Over IP (VoIP) enabled packet switched (PS) bearers may not always be available. To allow operators to start offering IMS-based services while voice enabled PS-bearers are being built out, the industry has developed solutions that use existing Circuit Switched (CS) networks to access IMS services. These solutions are referred to as IMS Centralized Services (ICS). ICS is described in 3GPP TS 23.292 and is also the name of the Work Item in 3GPP Release 8 addressing these matters. ICS allows a User Equipment (UE) to connect to a CS access network and to have access to Multimedia Telephony services.

Figure 2:
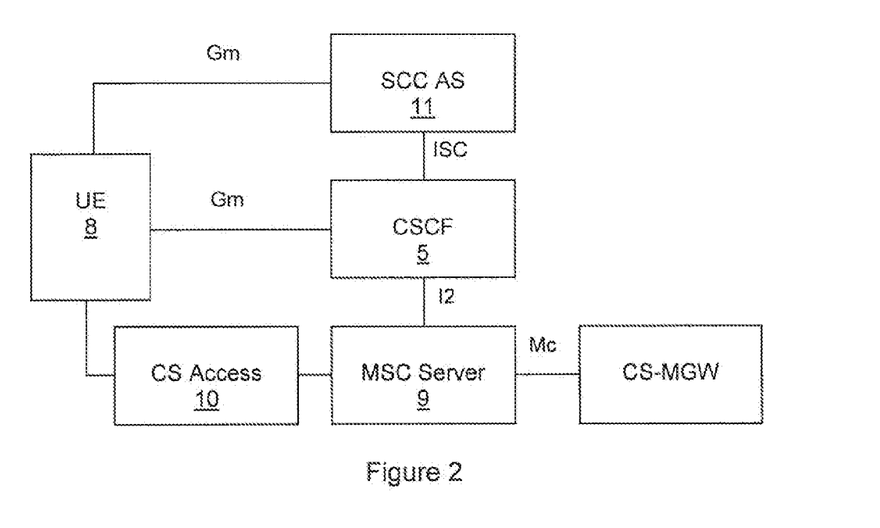
FIG. 2 illustrates schematically in a block diagram an IMS Centralized Services network.

Referring to FIG. 2, a UE 8 can access an MSC Server 9 via a CS Access network 10. It also accesses a CSCF 5 via a Gm reference point, and a Service Centralization and Continuity Application Server (SCC AS) 11 via a Gm reference point. SIP is used to perform service control between the ICS UE 8 and the SCC AS 11 over the Gm interface. For a speech service, the ICS UE 8 can use its CS access to transfer voice media. The ICS specification defines how it is possible to use a CS bearer controlled via the Gm interface.

When a SCC AS 11 receives an incoming call, or other type of session request (or other type of media component, such as video), it will select an access domain. The procedures specified in TS 23.292 allow for CS access to be selected, but keep the provision of services entirely in the IMS. This can result in unnecessary routing of signalling and media.

Figure 3:
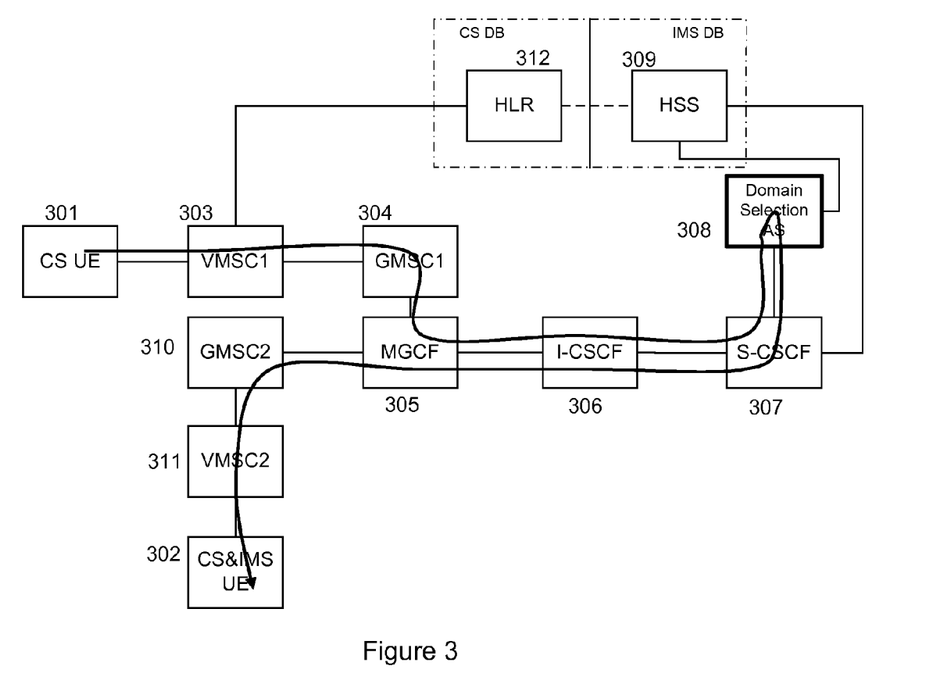
FIG. 3 illustrates schematically using a block diagram the signalling path for terminating a call in an IMS Centralized Services network in accordance with current standard procedure.

For example, if a UE is accessing services via a CS access network (i.e. anchored on the CS domain), and receives a call from another UE, also anchored on CS, then the current ICS solution will force the call from the CS domain to the IMS to perform the Terminating-Access Domain Selection (T-ADS), and then route it back to the CS domain after detecting that the UE is anchored on CS. This is illustrated in FIG. 3. An originating CS-anchored UE 301 initiates a call/session with a terminating UE 302, which is registered in both the CS and IMS network domains. The signalling for T-ADS is via the Visited Mobile Switching Centre, VMSC1 303 in the CS network to which the originating UE 301 is anchored, and then via a Gateway Mobile Switching Centre, GMSC1 304 to MGCF 305, I-CSCF 306, S-CSCF 307 and eventually to Domain Selection AS 308 (e.g. an SCC AS) in the home IMS network of the terminating UE 302. To enable the access selection the AS 308 accesses data relating to the terminating UE 302 from the Home Subscriber Server, HSS, 309. To complete the Terminating procedure the signalling is then routed back through the IMS via S-CSCF 307, I-CSCF 306 and MGCF 305 to GMSC2 310 and VMSC2 311 to which terminating UE 302 is anchored in the CS network.

Analysis of the B-number (of the terminating UE 302) will determine whether or not the terminating UE is in the CS domain. This will be the case if the B-number cannot be resolved by ENUM, or if the B-number is within a number range for another operator that is not classified as a IMS operator.

Possible solutions to reduce the amount of unnecessary signalling that have been proposed include upgrading the Home Location Register, HLR 312 to perform the terminating domain selection. However, the HLR and HSS databases are usually deployed independently of each other and the lack of a uniform interface means it is difficult to query between HLR and HSS. Therefore this solution is not practical, at least until such time as there is a unified storage and query between the HLR and IMS HSS.

SUMMARY

The present invention proposes an alternative solution, which ensures that the Service Domain Selection is always handled by the IMS, while allowing calls initiated in the CS domain to continue in CS to/from the served user. In addition, embodiments provide means to distribute service settings from the IMS to the CS domains without the need to synchronise the HLR and HSS data in the event that the CS service domain is selected. Certain assumptions have been made, including that terminating calls from the PSTN or via the GRX interface are routed to the entity that routes the incoming call—i.e. the GMSC. Also, in some CS access networks the routing entity, i.e. the MSC server, may already be enhanced, or have an enhanced capability for ICS where the user includes an ICS flag, but here it is assumed that the MSC server is either not enhanced for ICS or the ICS flag is not provided to the MSC. It is also noted that ICS users must always receive IMS services.

In one aspect there is provided a method of using IMS Centralised Services, ICS, in the selection of a service domain on the terminating side of a call originated by an originating side User Equipment, UE, to a terminating side UE being served by a CS access network. The method includes receiving, in the terminating UE's CS access network, a call set-up message from the originating UE. A request is sent to a Service Domain Selection, SDS, function for selection of a service domain for the call. A service domain selection indication is received from the SDS function and, based on the received selection indication, the call is routed either via the IMS service domain or directly to the terminating UE via the CS service domain.

The call set-up message may be received at a Gateway Mobile Switching Centre, GMSC. The GMSC sends the request to a Service Control Point, SCP, that includes the SDS function, which checks the SDS data of the terminating UE. The selection of the service domain is determined by the SDS function.

The method may also include receiving CS service data at the GMSC including instructions for the processing of certain call events in the CS domain. The CS service data may include data derived from IMS service data and/or predefined data stored in the IMS. The CS service data may include data for processing by an MSC or a Visitor Location Register, VLR, in which case the GMSC forwards that data to an appropriate MSC or VLR.

In another aspect there is provided a method of using IMS Centralised Services, ICS, in the selection of a service domain on the originating side of a call originated by a User Equipment, UE, being served by a Circuit Switched, CS, access network to a terminating side UE. The method includes receiving a call set-up message from the originating side UE. A request is sent to a Service Domain Selection, SDS, function in the originating UE's home IMS network. A service domain selection indication is received from the SDS function, and, based on the received selection indication, the call is routed either via the IMS service domain or via the CS domain.

The call set-up message may be received at a Mobile Switching Centre, MSC, the MSC sending a request to a Service Control Point, SCP, that includes a SDS function. The SDS function checks the SDS data of the originating UE. The selection of the service domain is determined by the SDS function.

The method may also include receiving CS service data at the MSC including instructions for the processing of certain call events in the CS domain. The CS service data may be derived from IMS service data and/or include predefined data stored in the IMS.

In another aspect there is provided a method of using IMS Centralised Services, ICS, in the selection of a service domain relating to a call involving a User Equipment, UE, being served by a CS access network. The method includes receiving a request from a routing node for a service domain selection at a Service Control Point, SCP, in the UE's IMS network. The SCP includes a Service Domain Selection, SDS, function that retrieves data relating to the UE from a Domain Selection function. Based on the retrieved data, either the IMS service domain or the CS service domain is selected as the service domain for routing the call. An indication of the selected service domain is sent to the routing node.

The method may also include providing CS service data to the routing node, including instructions for the processing of certain call events in the CS domain. The CS service data may be derived from IMS service data and/or include predefined data stored in the IMS.

In embodiments, the SCP may be collocated with a Service Continuity Centralisation Application Server, SCC-AS, having an Access Domain Selection function. Alternatively, the SCP may be collocated with a Telephony Application Server, TAS.

Selecting the service domain may be based, at least in part, on one or more of the following criteria:
  where the originating or terminating UE requires IMS-specific services, selecting the IMS domain;
  where the originating UE is utilising an IMS Voice over PS access, selecting the IMS domain;
  where the call forwarding and call barring settings are synchronised between CS and IMS, selecting the CS domain;
  predetermined operator preferences.

In another aspect there is provided an Application Server, AS of an IMS network. The AS receives a request from a routing node, for a service domain selection relating to a call originated by, or destined for a User Equipment, UE, being served by a Circuit Switched, CS, access network. The AS retrieves SDS data relating to the UE and, on they retrieved data, selects either the IMS service domain or the CS service domain. The AS provides a response to the routing node from which the request was received. The response includes instructions for routing the call in accordance with the selected service domain.

When the selected service domain is the CS domain, the AS may also provide CS service data, including instructions for the processing of certain call events in the CS domain.

In another aspect there is provided a Mobile Switching Centre, MSC. On receiving a call set-up request originated by a User Equipment, UE, being served by a Circuit Switched, CS, access network, and destined for a terminating UE being served by a CS access network, the MSC sends a service domain selection information request to a home IMS network of the originating UE. On receiving the requested information from the IMS, the MSC routes the call via either the IMS service domain or the CS service domain in accordance with a selection instruction in the received information. If the call is routed via the CS domain, the MSC processes additional CS service data provided with the received information, including instructions for the processing of certain call events in the CS domain.

In another aspect there is provided a Gateway Mobile Switching Centre, GMSC. On receiving a call set-up request originated by a User Equipment, UE, being served by a Circuit Switched, CS, access network and destined for a terminating UE being served by a CS access network, the GMSC requests service domain selection information from a home IMS network of the terminating UE. On receiving the requested information from the IMS, the GMSC routes the call via either the IMS service domain or the CS service domain in accordance with a selection instruction in the received information. If the call is routed via the CS domain, the GMSC processes additional CS service data provided with the received information that includes instructions for the processing of certain call events in the CS domain.

The GMSC may also determine if the CS service data includes data for processing by an MSC or a Visitor Location Register, VLR, and forwards that data to an appropriate MSC or VLR.

DETAILED DESCRIPTION

The methods described below make use of a Service Domain Selection (SDS) function, which is configured to access a Domain Selection function and to intelligently select what service domain, IMS or CS, to use for a call/session. To do this the SDS acquires knowledge of the UEs reachability over both PS and CS access. In the call set-up procedure the SDS is queried to determine whether to route the call to the IMS or whether to continue the call setup in the CS domain. On the terminating side of the call, the SDS is queried by the GMSC when it receives a call set-up request. On the originating side of the call, the SDS is queried by the MSC. Each of these is described in more detail below. The SDS function could be implemented as part of an existing function, such as the SCC AS or a Telephony Application Server, TAS. In the description below, the SCC AS is used as an example, but this could also be done, for example, in the TAS.

To make the decision, the SDS applies certain criteria. For example:

where the originating or terminating UE requires IMS-specific services, selecting the IMS domain;
where the originating UE is utilising an IMS Voice over PS access, selecting the IMS domain;
where the call forwarding and call barring settings are synchronised between CS and IMS, selecting the CS domain.

In the event that the terminating side UE is registered in both the IMS and CS networks, the SDS function decides whether to locally route the call in the CS domain or whether to route it via the IMS, depending on certain predetermined criteria, for example operator preferences.

Figure 4:
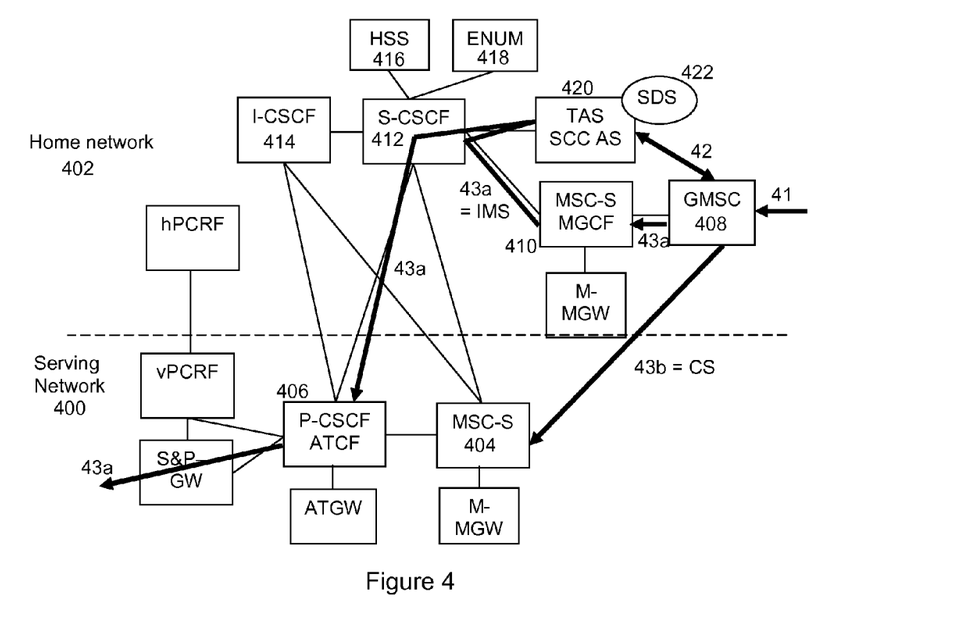
FIG. 4 illustrates schematically using a block diagram the signalling paths for terminating a call in a CS access network using IMS Centralized Services in accordance with the present disclosure.

Referring to FIG. 4, the terminating side of a call/session includes a serving network, 400 to which the terminating UE (not shown) is attached, and the UE's home network 402. The network entities, or nodes, shown include both CS and IMS entities (see FIG. 1). The serving/access network includes a routing entity, an example of which is an MSC Server, 404, and a P-CSCF 406. Other network entities, such as gateways are also shown but these are not important for the present discussion. The home network includes a gateway routing entity, which in this example is a GMSC 408, as well as certain IMS entities, including a MGCF 410, which links to the GMSC 408, a S-CSCF 412, an I-CSCF 414, and HSS 416, an ENUM telephone number mapping server 418 and a SCC AS 420, which includes an entity that performs a domain selection, in this example a Terminating Access Domain Selection, T-ADS function. As shown in FIG. 4, the SCC AS 420 also hosts a SCP in the form of the SDS function 422, as described above.

FIG. 4 shows the signaling paths in the set-up of the terminating side of a call. In accordance with established procedure, the call set-up request signal is received at the GMSC 408. As mentioned above, the B-number (of the terminating UE 302) used in the call will determine that the terminating UE is using the CS domain. This will be the case if the B-number cannot be resolved by ENUM, or if the B-number is within a number range for another operator that is not classified as an IMS operator. However, unlike in established ICS procedures as described in 3GPP TS 23.292, instead of routing the signaling immediately to the IMS, the GMSC is configured to initiate a check shown as path 42, with the SDS 422 (shown in FIG. 4 as being collocated with the SCC AS 420) as to whether the call should be routed via the IMS or whether to continue to route the call directly to the terminating UE via the CS domain. The SDS 422 will use the Access Domain Selection function of the SCC AS 420 to discover the capabilities and service parameters of the terminating UE, and apply predetermined criteria to make a selection as to whether the call should be routed via the IMS or continue directly via the CS domain.

If the IMS is selected, the call is routed from the GMSC 408 to the IMS, in accordance with the established procedure of 3GPP TS 23.292 shown by path 43*a*—i.e. via MGCF 410, S-CSCF 412, SCC AS 420, and P-CSCF 406. If the CS domain is selected, the call is routed directly from the GMSC 408 to the MSC-S 404, as shown in path 43*b*.

Figure 5:
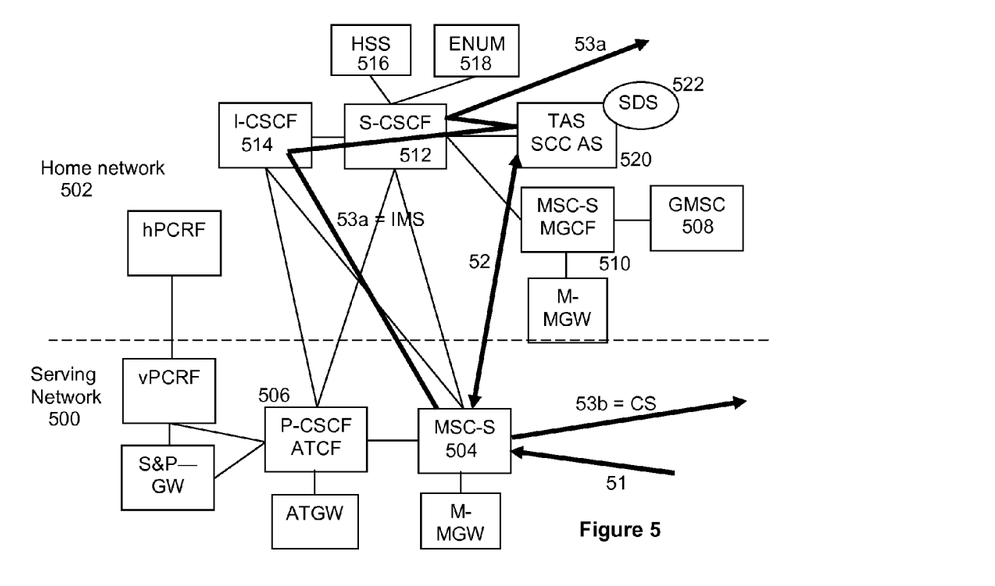
FIG. 5 illustrates schematically using a block diagram the signalling paths on the originating side of a call anchored in a CS access network using IMS Centralized Services in accordance with the present disclosure.

FIG. 5 shows the corresponding situation at the originating side including a serving network, 500 to which the originating UE (not shown) is attached, and the originating UE's home network 502. The network entities shown include a MSC Server 504, and a P-CSCF 506, a GMSC 508, a MGCF 510, a S-CSCF 512, an I-CSCF 514, HSS 516, ENUM 518, and a SCC AS 520, which includes an Originating Access Domain Selection, OAS function. The SCC AS 520 also hosts a SCP in the form of the O-SDS function 522.

FIG. 5 shows the signaling paths in the set-up of the originating side of a call initiated by the originating UE in the CS domain. In accordance with established procedure, the call set-up request signal 51 is received at the MSC 504. Instead of routing the signaling immediately to the IMS, the MSC 504 is configured to initiate a check, shown as path 52, with the SDS 522 (shown in FIG. 5 as being collocated with the SCC AS 420) as to whether the call should be routed via the IMS or whether to continue to route the call directly to the terminating UE via the CS domain. The SDS 522 will use the Access Domain Selection function of the SCC AS 520 to discover the capabilities and service parameters of the originating UE, and apply predetermined criteria to make a selection as to whether the call should be routed via the IMS or continue directly via the CS domain.

If the IMS is selected, the call is routed from the MSC 504 to the IMS, in accordance with the established procedure of 3GPP TS 23.292 shown by path 53*a*—i.e. via I-CSCF 514, S-CSCF 512, and SCC AS 520. If the CS domain is selected, the call is routed directly from the MSC-S 504, as shown in path 53*b*.

Figure 6:
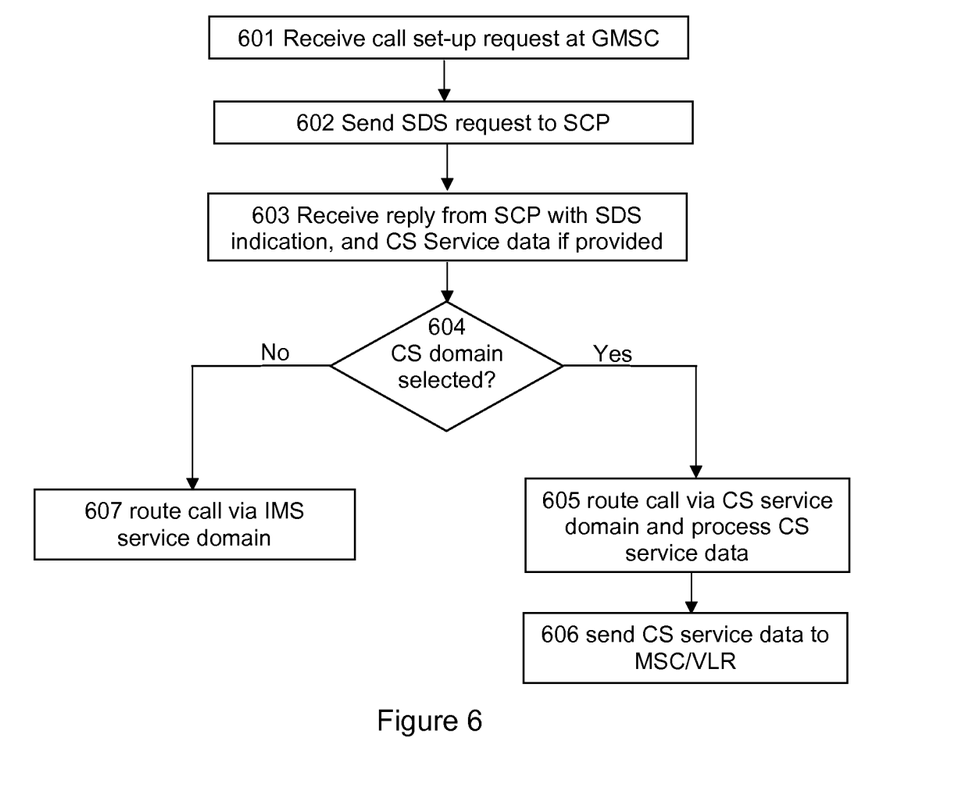
FIG. 6 is a flow diagram illustrating method steps in a method of service domain selection for a terminating call using IMS Centralized Services in accordance with the present disclosure.

FIG. 6 is a flow diagram illustrating the principal method steps for the method of using ICS in the selection of a service domain on the terminating side of a call, where the terminating side UE is being served by a CS access network. At step 601, a call set-up message from the originating UE is received at the GMSC 408 (see FIG. 4). At step 602, the GMSC 408 sends a Service Domain Selection, SDS, request to the SCP, which in the embodiment illustrated in FIG. 4 is collocated with SCC AS 420, and includes an SDS function for selecting a service domain for the call. At step 603, the GMSC receives a reply from the SCP that includes an indication of the service domain selection made by the SDS function. In addition, if the CS service domain was selected, the GMSC may also receive CS service data, including instructions for the processing of certain call events in the CS domain. These will be described further below. At step 604, the GMSC 408 detects if the received selection indication indicates that the CS domain has been selected, and if so, at step 605 continues routing the call directly to the terminating UE via the CS domain. In addition, if additional CS service data has been provided at step 603, then the GMSC will process this. The data may include instructions which are to be processed by the GMSC, or may include data that is relevant for the MSC or VLR serving the terminating UE, in which case the GMSC, at step 606, forwards the CS data to the MSC/VLR.

Alternatively, if at step 604 the selection indication indicates that the IMS has been selected, then at step 607, the GMSC 408 routes the call via the IMS service domain.

Figure 7:
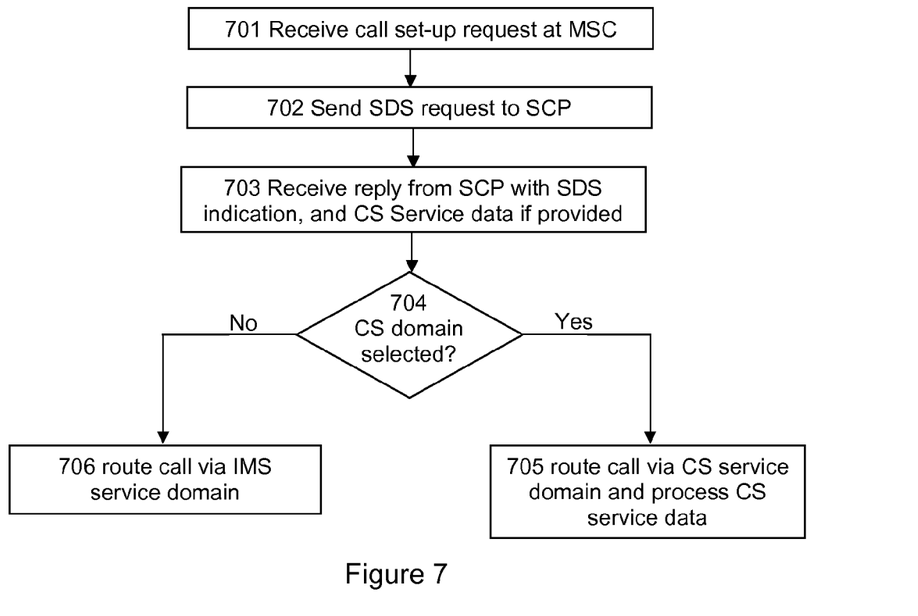
FIG. 7 is a flow diagram illustrating method steps in a method of service domain selection for an originating call using IMS Centralized Services in accordance with the present disclosure.

FIG. 7 is a flow diagram illustrating the principal method steps for the method of using ICS in the selection of a service domain on the originating side of a call, where the originating side UE is being served by a CS access network. At step 701, a call set-up message from the originating UE is received at the MSC 504 (see FIG. 5). At step 702, the MSC 504 sends a Service Domain Selection, SDS, request to the SCP, which in the embodiment illustrated in FIG. 5 is collocated with SCC AS 520, and includes an SDS function 522 for selecting a service domain for the call. At step 703, the MSC receives a reply from the SCP that includes an indication of the service domain selection made by the SDS function. In addition, if the CS service domain was selected, the MSC may also receive CS service data, including instructions for the processing of certain call events in the CS domain. These will be described further below. At step 704, the MSC 504 detects if the received selection indication indicates that the CS domain has been selected, and if so, at step 705 continues routing the call directly to the terminating side via the CS domain. In addition, if additional CS service data has been provided at step 703, then the MSC will process this.

Alternatively, if at step 704 the selection indication indicates that the IMS has been selected, then at step 707, the MSC 504 routes the call via the IMS service domain.

Figure 8:
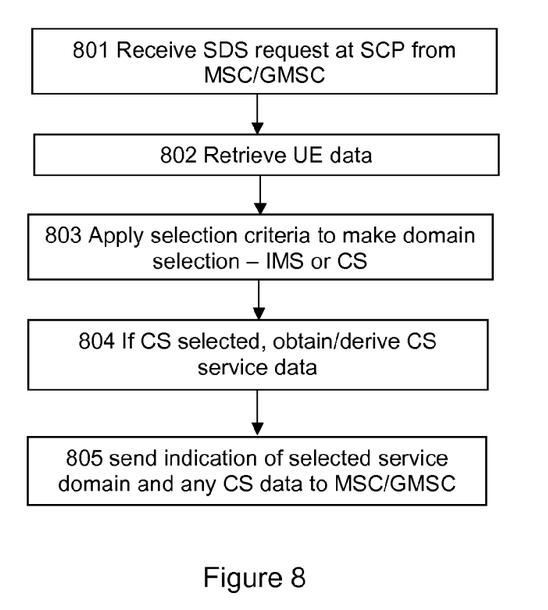
FIG. 8 is a flow diagram illustrating method steps in a method of service domain selection using IMS Centralized Services relating to a call involving a User Equipment, UE, being served by a CS access network in accordance with the present disclosure.

FIG. 8 is a flow diagram illustrating the principal method steps for the method of using IMS Centralised Services, ICS, in the selection of a service domain relating to a call involving a User Equipment, UE, being served by a CS access network. At step 801 a request is received at a SCP from a MSC or a GMSC for a service domain selection. The SCP includes a SDS, function, and may, for example, be collocated with a SCC AS, as shown in FIG. 4 or FIG. 5. At step 802, the SDS retrieves data relating to the UE that it needs to make the service domain selection. This may include retrieving UE data from a Domain Selection function (e.g. an ADS function). At step 803, the SDS applies selection criteria to make a selection, based on the accessed data, selecting either the IMS service domain or the CS service domain as the service domain for routing the call. At step 804 the SCP also determines if there is any CS service data that should be provided to the MSC/GMSC. At step 805, the SCP sends a reply to the MSC or GMSC, including an indication of the selected service domain, together with any CS service data determined at step 804.

The CS service data determined at step 804, is accessed and provided in accordance with predefined rules programmed into the SCP/SDS. The CS data may be derived from IMS service data, in which case the SDS/SCP derives the information according to the predefined rules. Alternatively, the CS service data may be pre-defined and provisioned into the IMS, in which case the SCP/SDS simply accesses the data according to the predefined rules.

Thus, for a terminated call, where the SCP/SDS decides to terminate the call in the CS domain, the additional service data is provided to the GMSC which the GMSC has to execute. However, if service data actually to be executed by the MSC/VLR and not by the GMSC, the GMSC forwards the service data to the MSC/VLR. For an originated call, where the SDS decides to originate the call in the CS domain, the SCP/SDS provides the additional service data to the MSC which the MSC has to execute.

One example for implementing the methods described above is the use of the CAMEL (Customized Applications for Mobile network Enhanced Logic) Subscription Information (CSI). For terminating calls, CAMEL T-CSI can be used to interact between the GMSC and the SDS/SCC AS. For originated calls, CAMEL O-CSI can be used to interact between the MSC and the SDS/SCC AS. In both cases, when the SDS selects the IMS, the T/O-CSI provides a routing number in a response sent to the GMSC/MSC. If no routing number is provided, then the call continues to be routed in the CS domain. The CS service data can be carried as part of the T/O-CSI responses.

The methods and network solution described enable calls originated in the CS domain, or terminated to a GMSC, to only be sent to the IMS if they need to receive IMS services. In addition the solution enables the IMS to provide CS service data to GMSC and MSC/VLR for execution in the CS domain. This enables more calls to be handled in the CS domain, while still benefiting from services that would otherwise require the call to be routed via the IMS.

The invention claimed is:

1. A method of using Internet Protocol Multimedia Subsystem (IMS) Centralised Services (ICS) in a selection of a service domain on a terminating side of a call originated by an originating side User Equipment (UE) to a terminating side UE being served by a Circuit Switched (CS) access network, the method comprising:
  receiving, in the terminating UE's CS access network, a call set-up message from the originating UE;
  sending a request to a Service Domain Selection (SDS) function for selection of a service domain for the call to determine when the call should be routed in an IMS service domain or in a CS service domain;
  receiving a service domain selection indication from the SDS function;
  responsive to sending the request to the SDS function and a determination that the call should be routed in the CS service domain, receiving CS service data including instructions for the processing of call events in the CS domain; and
  based on the received selection indication, routing the call either via the IMS service domain or directly to the terminating UE via the CS service domain,
  wherein:
    the call set-up message is received at a Gateway Mobile Switching Centre (GMSC) in the terminating UE's CS access network,
    the GMSC sends the request to a Service Control Point (SCP) in a home IMS network of the terminating UE that comprises the SDS function for checking the SDS data of the terminating UE and determining whether to route the call to the IMS service domain or whether to continue the call in the CS service domain,
    the CS service data is received at the GMSC, and
    the selection of the service domain is determined by the SDS function.

2. The method of claim 1 wherein the CS service data comprises data derived from IMS service data and/or comprises predefined data stored in the IMS.

3. The method of claim 2, wherein the CS service data includes data for processing by a Mobile Switching Centre (MSC) or a Visitor Location register (VLR) the method further comprising forwarding by the GMSC the data to a MSC or VLR.

4. The method of claim 1, wherein the SDS function provides the service domain selection indication without accessing a Home Subscriber Server (HSS) or a Home Location Register (HLR) of the terminating UE.

5. A method of using Internet Protocol Multimedia Subsystem (IMS) Centralised Services (ICS) in a selection of a service domain on a originating side of a call originated by an originating User Equipment (UE) being served by a Circuit Switched (CS) access network to a terminating side UE, the method comprising:
  receiving a call set-up message from the originating side UE;
  sending a request to a Service Domain Selection (SDS) function in the originating UE's home IMS network to determine when the call should be routed in an IMS service domain or in a CS service domain;
  receiving a service domain selection indication from the SDS function;
  responsive to sending the request to the SDS function and a determination that the call should be routed in the CS service domain, receiving CS service data including instructions for the processing of certain call events in the CS domain; and
  based on the received service domain selection indication, routing the call either via the IMS service domain or via the CS domain,
  wherein:
    the call set-up message is received at a Mobile Switching Centre (MSC) in the CS access network,
    the MSC sends a request to a Service Control Point (SCP) in the home IMS network of the originating UE that comprises the SDS function for checking the SDS data of the originating UE and determining whether to route the call to the IMS service domain or whether to continue the call in the CS service domain,
    the CS service data is received at the MSC, and
    the selection of the service domain is determined by the SDS function.

6. The method of claim 5 wherein the CS service data comprises data derived from IMS service data and/or comprises predefined data stored in the IMS.

7. A method of using Internet Protocol Multimedia Subsystem (IMS) Centralised Services (ICS) in a selection of a service domain relating to a call involving a User Equipment (UE) being served by a Circuit Switched (CS) access network, the method comprising:
  receiving a request from a routing node in the CS access network for selection of a service domain at a Service Control Point (SCP) that comprises a Service Domain Selection (SDS) function in the UE's home IMS network,
    wherein the request from the routing node in the CS access network is responsive to a Mobile Switching Centre (MSC) in the CS access network receiving a call set-up message from the UE being served by the CS access network as an originating UE or responsive to a Gateway Mobile Switching Centre (GMSC) in the CS access network receiving a call set-up message from an originating UE to the UE being served by the CS access network;
  retrieving data relating to the UE from a Domain Selection function;
  based on the retrieved data, selecting either the IMS service domain or the CS service domain as the service domain for routing the call;
  sending an indication of the selected service domain to the routing node; and
  responsive to selecting the CS service domain as the service domain for routing the call, providing CS service data to the routing node including instructions for the processing of certain call events in the CS domain.

8. The method of claim 7 wherein the CS service data comprises data derived from IMS service data and/or comprises predefined data stored in the IMS.

9. The method of claim 7, wherein the SCP is collocated with a Service Continuity Centralisation Application Server, SCC-AS, having an Access Domain Selection function.

10. The method of claim 7, wherein the SCP is collocated with a Telephony Application Server, TAS.

11. The method of claim 7 wherein selecting either the IMS service domain or the CS service domain is based, at least in part, on one or more of the following criteria:
responsive to the originating UE of the call utilizing an IMS Voice over PS access, selecting the IMS domain; and
responsive to call forwarding and call barring settings being synchronised between CS and IMS, selecting the CS domain.

12. The method of claim 7, wherein the retrieved data relating to the UE from the Domain Selection function and the CS service data are different.

13. The method of claim 7, wherein retrieving the data relating to the UE from the Domain Selection function is performed without accessing a Home Subscriber Server (HSS) or a Home Location Register (HLR) of the UE.

14. An Application Server of an Internet Protocol Multimedia Subsystem (IMS) network comprising:
at least one processor configured to:
receive a request from a routing node in a Circuit Switched (CS) access network, for selection of a service domain relating to a call originated by, or destined for a User Equipment (UE) being served by the CS access network,
wherein the request from the routing node in the CS access network is responsive to a Mobile Switching Centre (MSC) in the CS access network receiving a call set-up message from the UE being served by the CS access network as an originating UE or responsive to a Gateway Mobile Switching Centre (GMSC) in the CS access network receiving a call set-up message from an originating UE to the UE being served by the CS access network;
retrieve SDS data relating to the UE and based thereon to select either the IMS service domain or the CS service domain; and
provide a response to the routing node from which the request was received, the response including instructions for routing the call in accordance with the selected service domain; and
responsive to selecting the CS service domain as the service domain for routing the call, provide CS service data to the routing node comprising instructions for the processing of certain call events in the CS domain.

15. The Application Server of claim 14, wherein the retrieved SDS data relating to the UE and the CS service data are different.

16. The Application Server of claim 14, wherein selecting either the IMS service domain or the CS service domain is based, at least in part, on one or more of the following criteria:
responsive to the originating UE of the call utilizing an IMS Voice over PS access, selecting the IMS domain; and
responsive to call forwarding and call barring settings being synchronised between CS and IMS, selecting the CS domain.

17. The Application Server of claim 14, wherein retrieving the SDS data relating to the UE is performed without accessing a Home Subscriber Server (HSS) or a Home Location Register (HLR) of the UE.

18. A Mobile Switching Centre (MSC) Server comprising:
at least one processor configured to:
receive a call set-up request at the MSC server in a Circuit Switched (CS) access network that is originated by an originating User Equipment (UE) being served by the CS access network;
respond to receiving the call set-up request at the MSC server in the CS access network that is originated by the originating UE being served by the CS access network, by sending a service domain selection information request from the MSC Server to a Service Control Point (SCP) in a home Internet Protocol Multimedia Subsystem (IMS) network of the originating UE to determine when the call should be routed in an IMS service domain or in a CS service domain;
receive the requested service domain selection information from the home IMS network of the originating UE;
responsive to sending the service domain selection information request and a determination that the call should be routed in the CS service domain, receive CS service data including instructions for the processing of call events in the CS service domain; and
respond to receiving the requested service domain selection information from the home IMS network of the originating UE, by routing the call via either the IMS service domain or the CS service domain in accordance with a selection instruction in the received service domain selection information, and,
responsive to receiving the selection instruction indicating that the CS service domain is selected, processing the CS service data provided with the received information that includes instructions for the processing of certain call events in the CS service domain.

19. A Gateway Mobile Switching Centre (GMSC) Server comprising:
at least one processor configured to:
receive a call set-up request at the GMSC Server in a Circuit Switched (CS) access network that is destined for a terminating User Equipment (UE) being served by the CS access network;
respond to receiving the call set-up request at the GMSC Server in the CS access network that is destined for the terminating UE being served by the CS access network, by sending a service domain selection information request from the GMSC Server to a Service Control Point (SCP) in a home Internet Protocol Multimedia Subsystem (IMS) network of the terminating UE to determine when the call should be routed in an IMS service domain or in a CS service domain;
receive the requested service domain selection information from the home IMS network of the terminating UE;
responsive to sending the service domain selection information request and a determination that the call should be routed in the CS service domain, receive CS service data including instructions for the processing of call events in the CS service domain; and
respond to receiving the requested service domain selection information from the home IMS network of the terminating UE, by routing the call via either the IMS service domain or the CS service domain in accordance with a selection instruction in the received service domain selection information, and responsive to receiving the selection instruction indicating that the CS service domain is selected, processing the CS service data provided with the received information that includes instructions for the processing of certain call events in the CS service domain.

20. The GMSC of claim 19 wherein the at least on processor is further configured to determine if the CS service data includes data for processing by a Mobile Switching Centre (MSC) or a Visitor Location register (VLR) and to forward that data to a MSC or VLR.

* * * * *